United States Patent [19]
Feterl

[11] 3,905,644
[45] Sept. 16, 1975

[54] TRAILER FRAME STRUCTURE

[75] Inventor: Leon G. Feterl, Salem, S. Dak.

[73] Assignee: SOS Consolidated, Inc., Birmingham, Mich.

[22] Filed: Feb. 4, 1974

[21] Appl. No.: 439,397

[52] U.S. Cl. ............. 298/22 AE; 29/428; 298/22 J
[51] Int. Cl. .............................................. B60p 1/16
[58] Field of Search... 298/17 R, 17 B, 17 S, 17 SG, 298/17.5, 17.6, 17.7, 17.8, 18, 19 R, 19 B, 19 V, 20 R, 20 A, 22 R, 22 AE, 22 C, 22 F, 22 J, 22 P, 22 A, 22 B, 22 D, 21 R, 21 V, 23 R, 23 MD, 23 M, 23 S, 23 A, 23 B, 23 F, 23 D, 23 DF, 23 C; 214/500–505

[56] References Cited
UNITED STATES PATENTS
| | | | |
|---|---|---|---|
| 1,264,460 | 4/1918 | Wallace | 298/22 F |
| 2,710,224 | 6/1955 | Horvath | 298/22 AE |
| 2,732,253 | 1/1956 | Birdwell | 298/21 R |
| 3,082,892 | 3/1963 | Cox | 214/505 |

Primary Examiner—Frank E. Werner
Attorney, Agent, or Firm—Williamson, Bains & Moore

[57] ABSTRACT

A chassis and tilt bed support structure for a tilt bed trailer, with the chassis being comprised of a pair of elongated frame beams widely spaced apart at their rear ends by a distance substantially coinciding with the axle length and bent inwardly towards each other at their forward ends to provide a pair of relatively closely spaced, parallel, front beam segments on which the front ends of a pair of parallel, truck body support beams are supported. The body support beams are pivotally mounted on the rear end of the chassis; and a single pole drawbar and trailer hitch assembly is rigidly secured to the forward end of the closely spaced, front beam segments of the chassis.

8 Claims, 7 Drawing Figures

TRAILER FRAME STRUCTURE

BRIEF SUMMARY OF THE INVENTION

This invention is directed to an improved chassis and tilt bed support structure for a tilt bed trailer, particularly characterized by a chassis frame structure so sized and shaped as to place the weight of the truck body and cargo substantially directly over widely spaced wheels, while at the same time providing solid support for the more closely spaced tiltable body support beams and permitting the solid, rigid mounting of a single pole drawbar of the gooseneck type to the front end of the chassis.

These basic objectives and advantages are realized by forming the chassis structure from a pair of laterally spaced, elongated frame beams which are bent inwardly to their forward ends to form a pair of relatively widely spaced rear beam segments, a pair of intermediate beam segments angling inwardly and forwardly, and a pair of relatively closely spaced, parallel, front beam segments. The closely spaced front beam segments are spaced apart by a distance equal to the lateral spacing between elongated body support beams pivotally attached to the rear of the chassis frame beams; and the front beam segments of the chassis and the body support beams are vertically aligned, with the front ends of the body support beams being supported on said front beam segments of the chassis when the tilt bed is in its downwardly pivoted travel position.

The closely spaced front beam segments of the chassis structure also provide a solid, compact mounting means for the base end of a single pole drawbar. This is advantageously accomplished by using rearwardly angling strut beams welded to the base end of the drawbar to attach the drawbar assembly to the front ends of the closely spaced front beam segments.

A particularly advantageous aspect of my invention resides in the manufacturing process of forming and fabricating the aforesaid chassis structure. This is accomplished in an efficient and effective way by the use of a special bending and welding jig and fixture on which the two chassis frame beams are initially positioned in laterally spaced, parallel relation to each other. With the rear end segments of the frame beams restrained on the fixture, the unrestrained front ends of the frame beams are bent inwardly towards each other against a first, forward set of stops and then against a second set of more rearwardly disposed stops to form a pair of closely spaced, parallel front beam segments interconnected with the more widely spaced rear beam segments by a pair of inwardly and forwardly angling beam segments. The inner, base end of a drawbar subassembly is then welded to the front ends of the aforesaid, closely spaced front beam segments. These and other objects and advantages of my invention will become readily apparent as the following description is read in conjunction with the accompanying drawings wherein like reference numerals have been used to designate like elements throughout the several views.

DESCRIPTION OF THE PREFERRED EMBODIMENT

Figure 1:
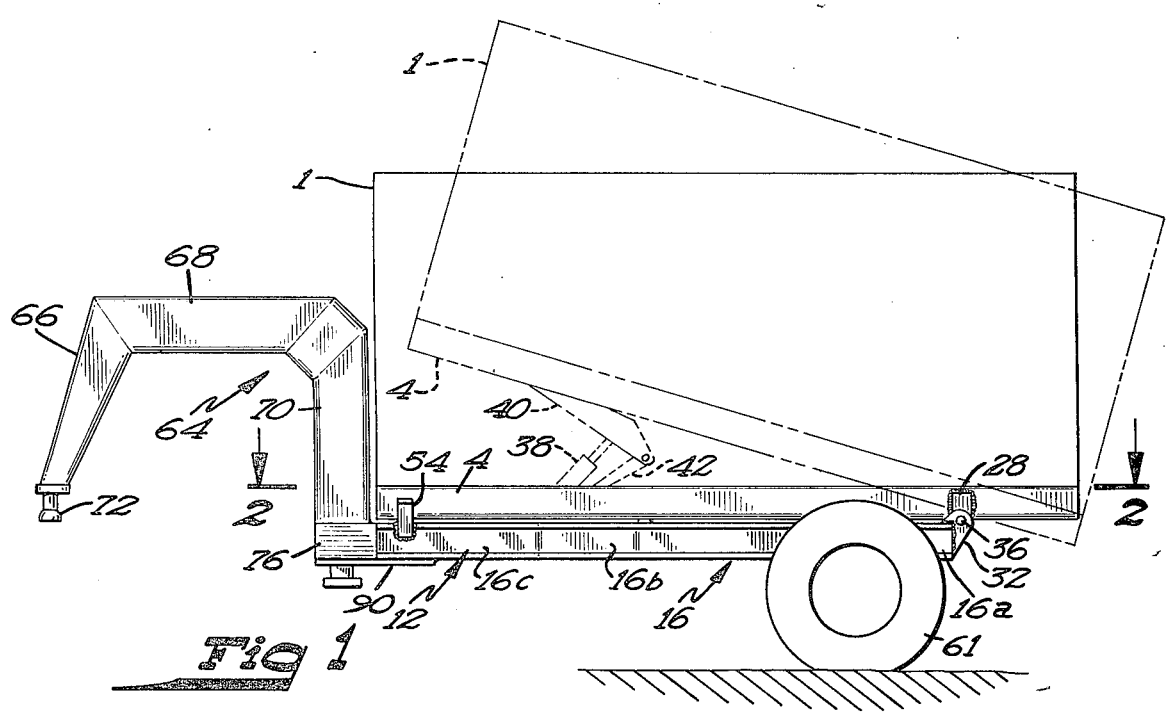
FIG. 1 is a side elevation view of a tilt bed trailer incorporating the chassis and bed support structure of this invention.
Figure 2:
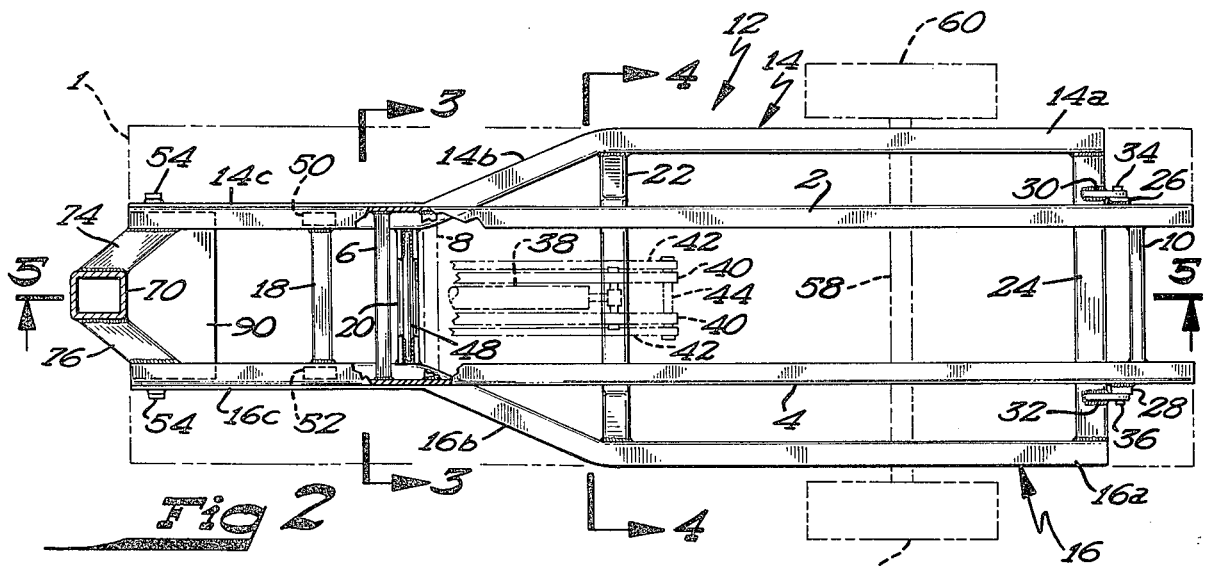
FIG. 2 is a top, plan view, partially in section, taken along lines 2—2 of FIG. 1, and showing the chassis and bed support structure.

Referring now to the drawings, I have shown in FIGS. 1 and 2 a tilt bed trailer embodying the improved chassis and tilt bed support structure of this invention. The trailer body is generally designated by reference numeral 1 and is supported on a pair of elongated, laterally spaced support beams 2 and 4 affixed to the underside thereof. Body support beams 2 and 4 are joined together at spaced points along their length by a plurality of transverse bar members 6, 8, and 10 to form a rigid tilt bed frame.

Figure 5:
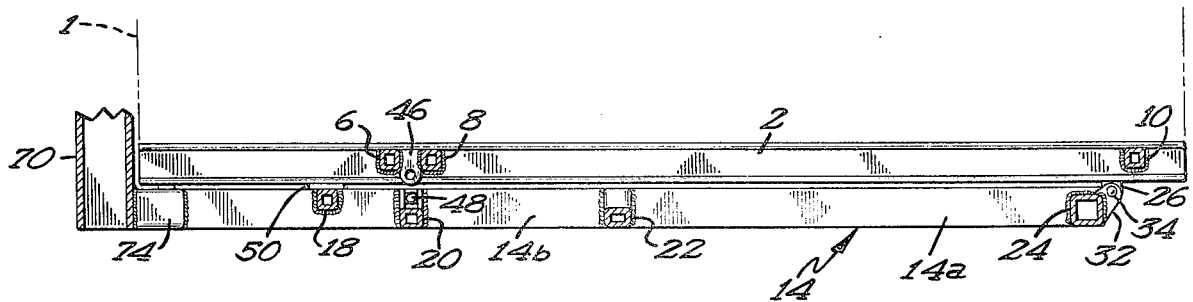
FIG. 5 is a vertical section view taken along lines 5—5 of FIG. 2.

Underlying the tilt bed frame in supporting relation thereto is a chassis structure generally indicated by reference numeral 12. The chassis structure 12 is comprised of a pair of elongated, laterally spaced frame beams 14 and 16 which extend lengthwise of the truck body and are interconnected at longitudinally spaced points by a plurality of crossbar members 18, 20, 22 and 24. As is indicated in FIG. 5, these crossbar members are preferably tubular steel segments. For reasons hereinafter explained, frame beams 14 and 16 of chassis 12 are formed as shown in FIG. 2 to provide a pair of relatively widely spaced rear beam segments 14a, 16a, a pair of intermediate beam segments 14b, 16b which angle inwardly and forwardly from the front ends of rear beam segments 14, 16, and a pair of relatively closely spaced front beam segments 14c, 16c extending forwardly from their juncture points with the front ends of intermediate beam segments 14b, 16b.

Figure 4:
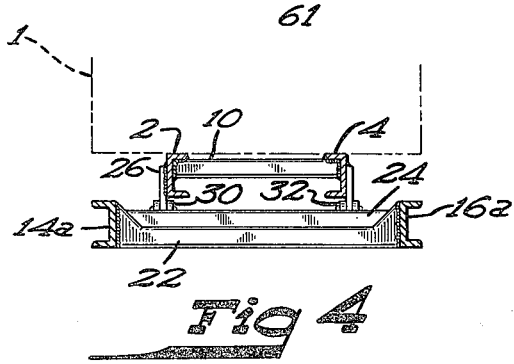
FIG. 4 is a vertical section view taken along lines 4—4 of FIG. 2.
Figure 6:
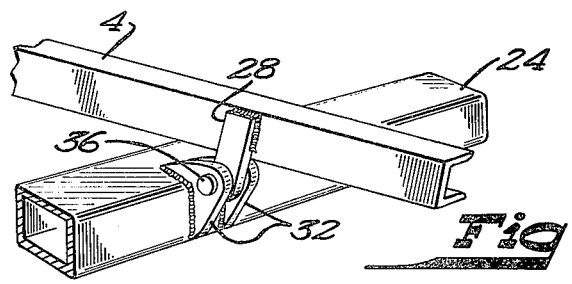
FIG. 6 is a fragmentary, perspective view showing the pivotal attachment of the tilt bed frame to the chassis.

For the purpose of pivotally supporting the tilt bed frame comprised of body support beams 2, 4 and transverse bar members 6, 8, and 10 extending therebetween, downwardly extending, apertured bracket arms 26 and 28 are attached to the rear, outside faces of support beams 2 and 4, as most clearly appears in FIGS. 2, 4 and 6. Bracket arms 26 and 28 are received between first and second sets of pivot ears 30 and 32 attached to the back of rear crossbar member 24 of the chassis frame structure. Pivot pins 34 and 36 extending through pivot ears 30, 32 and bracket arms 26, 28 define horizontal axes about which body support beams 2 and 4 may be pivoted upwardly and downwardly to raise and lower the tilt bed and truck body 1 resting thereon.

The tilt bed frame may be raised and lowered at its forward end to pivot support beams 2 and 4 about pivot pins 34 and 36 by various types of lift means conventionally employed on tilt bed trailers. By way of example, I have illustrated a scissors type of lift device in FIGS. 1, 2 and 3, the lift device being actuated by a hydraulic cylinder 38. Hydraulic cylinder 38 has its piston attached to a first set of scissors lift arms 40 which are pivotally connected to the second set of scissors lift arms 42 by a pivot pin 44. Upwardly extending lift arms 40 are pivotally attached at their forward ends to a pair of bracket ears 46 by means of a pivot pin extending therebetween. Bracket ears 46 are secured between transverse bar members 6 and 8 of the tilt bed frame and depend downwardly therefrom in the manner shown in FIG. 3 to provide an attachment means for the front end of the tilt bed frame to lift arms 40. The downwardly extending lift arms 42 of the scissors lift are pivotally attached to a bottom pivot bar 48 secured between front beam segments 14c and 16c of the chassis frame structure. Lift cylinder 38 likewise is pivotally attached at its base end to bottom pivot bar 48. This scissors lift assembly operates in a well known way to raise and lower the front end of the tilt bed frame, as required to unload a cargo from truck body 1.

Figure 3:
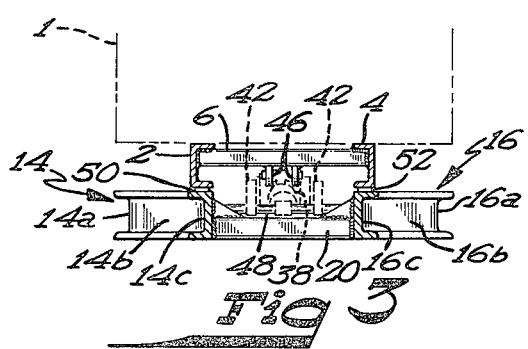
FIG. 3 is a vertical section view taken along lines 3—3 of FIG. 2.

As may be noted by reference to FIG. 2, front beam segments 14c, 16c of the chassis frame structure are laterally spaced apart by a distance substantially equal to the lateral space between body support beams 2 and 4, and are in vertical alignment therewith. This particular, close spacing of front beam segments 14c, 16c permits these straight beam segments to serve as support members for the forward ends of body support beams 2 and 4. Thus, when the tilt bed frame is swung downwardly to its travel position shown in solid lines in FIG. 1, the forward ends of body support beams 2 and 4 will be supported along a substantial portion of their lengths on top of chassis front beam segments 14c and 16c. Cushioning pads 50 and 52 shown in FIGS. 2 and 3 are attached to the top faces of front beam segments 14c and 16c to serve as seats for the forward ends of body support beams 2 and 4. With reference to FIGS. 2 and 4, it may be noted that the rear end portions of body support beams 2 and 4 lie between rear beam segments 14a and 16a of the chassis structure in inwardly spaced relation thereto, the rear pivot support of body support beams 2 and 4 on chassis rear cross beam 24 serving to support the rear end of the body support beams 2 and 4.

Trailer axle 58 shown in FIG. 2 in phantom lines has wheels 60 and 61 mounted on its opposite ends. Rear beam segments 14a and 16a of the chassis structure are laterally spaced apart a predetermined distance substantially equal to the length of axle 58 so that rear beam segments 14a and 16a will be supported on axle 58 in immediate proximity to wheel 60 and 61 in the manner shown in FIG. 2. This arrangement ensures that the weight load of truck body 1 and its cargo will be substantially directly transmitted to wheels 60 and 61, thereby avoiding any undue bending stress on relatively small diameter axle 58.

For the purpose of attaching the tilt bed trailer to a tow vehicle, hitch means in the form of a so-called gooseneck drawbar 64 is mounted on the front end of chassis frame beams 14 and 16. Drawbar 64 is of monopole construction and is comprised of a forward, upright segment 66 connected by a horizontal drawbar member 68 with a rear, upright stanchion 70. The three drawbar segments 66, 68 and 70 define together a substantially U-shaped drawbar unit having a coupling member 72 secured to the bottom of forward drawbar segment 66. Coupling member 72 may be of any type. For example, a socket type of coupling member may be utilized for attachment to a ball joint coupling provided on a tow vehicle. The cooperating hitch members for such gooseneck trailers are now commonly provided on the bed of pickup trucks.

The segments of the gooseneck drawbar 64 may be formed from tubular steel, as is indicated with respect to upright drawbar stanchions 70 in FIG. 2. A particularly solid, load transmitting attachment of drawbar 64 to chassis beams 14 and 16 is accomplished by means of short strut beams 74 and 76 which are welded to the opposed faces of the inner, base end of rear drawbar stanchion 70. Strut beams 74 and 76 angle rearwardly and outwardly from the opposite faces of upright drawbar stanchion 70 and are affixed, as by welding, at their outer ends to the forward, inside faces of front beam segments 14c and 16c of the chassis frame structure.

It will thus be seen that by bending the front ends of chassis beams 14 and 16 inwardly, a pair of straight, parallel, closely spaced front beam segments 14c and 16c are provided which advantageously serve the dual function of providing extended, longitudinal support for the pivotal body support beams 2 and 4, and also provide a solid, effective attachment means for a gooseneck type of drawbar. The close spacing of front beam segments 14c and 16c of the chassis structure permits the use of relatively short, sturdy strut beams 74 and 76 to secure upright drawbar stanchion 70 to these front beam segments. The relatively short, rearwardly angling strut beams 74 and 76 can withstand stress well, and are not subjected to undue bending stress, as would be the case with relatively long connecting beams required to extend from centrally located drawbar stanchion 70 to the widely spaced chassis beams normally employed on truck trailers.

Figure 7:
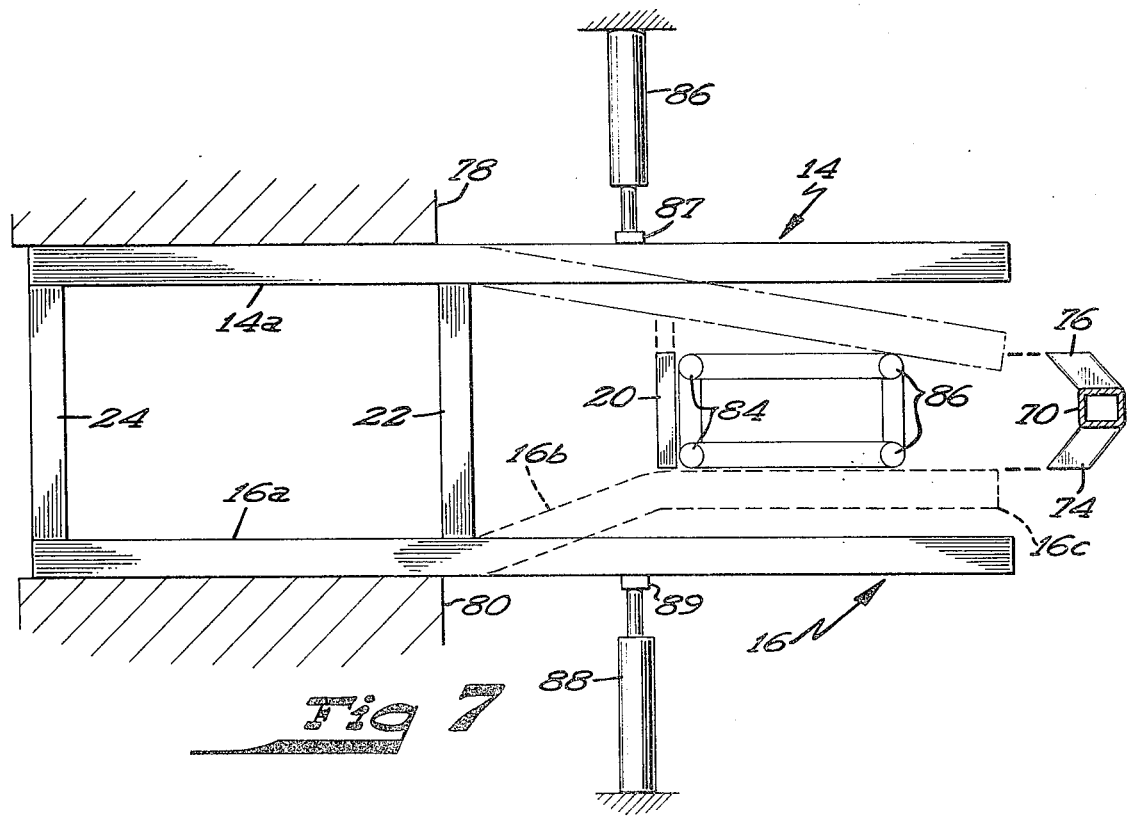
FIG. 7 is a schematic, plan view showing the method of forming the frame beams for the chassis.

In FIG. 7 I have illustrated schematically a preferred method of forming and fabricating the chassis structure on a special welding and bending jig and fixture. Elongated chassis frame beams 14 and 16 are initially secured in place in laterally spaced, parallel relation to each other in the manner shown in FIG. 7. Rear beam segments 14a and 16a are restrained against outward movement by holding members 78 and 80 bearing against the outside faces thereof. The front ends of frame beams 14 and 16 are unrestrained, and are spaced laterally outwardly from first and second sets of stop members 82 and 84. The forward set of stop members 82 are positioned between the frame beams 14 and 16 adjacent the front end thereof a predetermined distance inwardly; and the second set of stop members 84 is positioned rearwardly from stop members 82 in alignment therewith in a lengthwise direction with respect to the frame beams 14 and 16. This arrangement of the stop members 82 and 84 in alignment with each other ensures that the front beam segments 14c and 16c will be straight, and parallel with each other. Prior to the bending of the front ends of the frame beams 14 and 16, crossbar member 22 is secured, as by welding, intermediate the ends of the frame beams at predetermined bend points defined by the outer contact points of crossbar 22 with beams 14 and 16. Rear crossbar member 24 may also be welded in place between the rear ends of frame beams 14 and 16 prior to the bending operation.

The inward bending of the front ends of the frame beams is accomplished by a pair of oppositely disposed hydraulic cylinders 86 and 88 having piston heads 87 and 89. The pistons of hydraulic cylinders 86 and 88 are extended to bring their heads 87 and 89 against the outside faces of frame beams 14 and 16 at predetermined pressure points. The further extension of the hydraulic cylinder pistons causes an inward, laterally directed bending force to be applied to frame beams 14 and 16 intermediate their front ends and crossbar member 22, this force being applied through hydraulic cylinders 86 and 88 until the front ends of beams 14 and 16 contact the first set of laterally spaced stop members 82. Continued application of this inwardly directed bending force causes further bending of the front ends of frame beams 14 and 16 until intermediate portions thereof adjacent the pressure points of piston heads 87 and 89 engage the second set of laterally spaced stop members 84. This final bending step forms inwardly and forwardly angling, intermediate beam sections 14b and 16b, as is illustrated with respect to intermediate beam section 16b in FIG. 7. The first bending step in which the frame beams are bent inwardly about the bend points defined by crossbar member 22 is illustrated in FIG. 7 with respect to frame beam 14.

The fabrication of the chassis structure is completed by welding additional tie members between frame beams 14 and 16. It will be noted that crossbar member 22 is disposed at the first bend joint between intermediate beam segments 14b, 16b and rear beam segments 14a, 16a. An additional tie member in the form of crossbar 20 is welded between front beam segments 14c and 16c immediately adjacent to their juncture points with intermediate beam segments 14b and 16b at the location shown in FIG. 7.

The drawbar unit 64 is preferably prefabricated as a sub-assembly prior to attachment to the forward ends of chassis beams 14 and 16. The base end of upright drawbar stanchion 70 is positioned in a centrally aligned location between the longitudinal extent of front beam segments 14c and 16c and the outer, free ends of rearwardly and outwardly projecting strut beams 74 and 76 are welded to the forward ends of front beam segments 14c and 16c along the inside faces thereof as shown in FIGS. 2 and 7. A plate 90, shown in FIG. 2, may then be welded under strut beams 74 and 76 and the forward ends of front beam segments 14c and 16c to serve as an additional tieing member, and also to serve as a platform on which components of the hydraulically actuated lift apparatus may be mounted.

I anticipate that various changes and modifications may be made in the size, shape, and structural arrangement of the trailer chassis and bed support structure disclosed herein without departing from the spirit and scope of my invention as defined by the following claims.

I claim:

1. In combination with a tilt bed trailer having a truck body mounted on a tilt bed, an improved chassis and tilt bed support structure comprising:
    a tilt bed frame comprising a pair of elongated, laterally spaced body support beams affixed to the underside of the truck body along opposite sides thereof, said body support beams being connected at spaced points along their length by bar members extending transversely of said truck body;
    a chassis structure underlying said tilt bed frame and comprising a pair of elongated, laterally spaced frame beams extending generally lengthwise of said truck body and interconnected at longitudinally spaced points by cross bar members, said elongated frame beams comprising a pair of relatively widely spaced rear beam segments, a pair of intermediate beam segments angling inwardly and forwardly from the front ends of said rear beam segments, and a pair of relatively closely spaced front beam segments extending forwardly from the front ends of said intermediate beam segments, said front beam segments being substantially parallel to said rear beam segments and spaced apart along a width dimension substantially equal to the width dimension between said body support beams, with said body support beams being pivotally mounted on said chassis structure for raising and lowering movement about a substantially horizontal axis by lift means operatively associated therewith, the forward ends of said body support beams being in vertical alignment with said front beam segments of said chassis frame beams and being supported thereon when said tilt bed frame is in its downwardly pivoted travel position and with the rear ends of said body support beams lying between said rear beam segments of said chassis frame beams in inwardly spaced relation thereto;
    an axle extending transversely of said chassis structure in underlying, supporting relation thereto, and wheels on opposite ends of said axle; and
    hitch means secured to the forward end of said front beam segments.

2. The combination of a tilt bed trailer with a chassis and tilt bed support structure as defined in claim 1 wherein:
    said rear beam segments are spaced apart along a width dimension only slightly less than the length of said axle, with said rear beam segments of said chassis structure being supported on said axle in immediate proximity to said opposed wheels.

3. The combination of a tilt bed trailer with a chassis and tilt bed support structure as defined in claim 1 wherein:
    said elongated frame beams of said chassis structure are each formed from a single length of steel beam bent to form said rear, intermediate and front beam segments, with said intermediate beam segments interconnecting and extending between first bend joints at their points of intersection with the front ends of said rear beam segments and a second bend joint at their points of intersection with the rear ends of said front beam segments.

4. The combination of a tilt bed trailer with a chassis and tilt bed support structure as defined in claim 3 wherein:
    cross bar members are connected between and secured to said elongated frame beams of said chassis structure at each of said first and second bend joints.

5. The combination of a tilt bed trailer with a chassis and tilt bed support structure as defined in claim 1 wherein:
    the rear ends of said body support beams are pivotally supported on a cross bar member extending transversely between said rear beam segments of said chassis structure, whereby said tilt bed frame may be raised and lowered at its front end to unload cargo from said truck body.

6. The combination of a tilt bed trailer with a chassis and tilt bed support structure as defined in claim 1 wherein:
    said hitch means comprises a gooseneck drawbar having a hitch coupling member at its forward end, said gooseneck drawbar being of generally U-shape and having a rear, upright stanchion affixed at its lower end to a pair of strut beams angling rearwardly and outwardly from opposite sides of said upright stanchion and affixed at their outer ends to the forward ends of said front beam segments of said chassis structure.

7. In combination with a tilt bed trailer having a truck body mounted on a tilt bed, an improved chassis and tilt bed support structure comprising:

a tilt bed frame comprising a pair of elongated, laterally spaced body support beams affixed to the underside of the truck body along opposite sides thereof;

a chassis structure underlying said tilt bed frame and comprising a pair of elongated, laterally spaced, frame beams extending generally lengthwise of said truck body and interconnected at longitudinally spaced points by crossbar members extending therebetween, said elongated frame beams being bent inwardly towards each other at their forward ends to form frame beams comprising a pair of relatively widely spaced rear beam segments, a pair of intermediate beam segments angling inwardly and forwardly therefrom, and a pair of relatively closely spaced front beam segments which are substantially parallel to each other and to said body support beams, said front beam segments being laterally spaced apart by a distance substantially equal to the lateral space between said body support beams, with said body support beams being pivotally mounted on said chassis structure for upward and downward movement about a substantially horizontal axis by lift means operatively associated therewith, the forward ends of said body support beams being in vertical alignment with said front beam segments of said chassis frame beams and being supported thereon when said tilt bed frame is in a downwardly pivoted travel position, and the rear ends of said body support beams lying between said rear beam segments of said chassis frame beams in inwardly spaced relation thereto;

an axle extending transversely of said chassis structure in underlying, supporting relation thereto, said axle having wheels on opposite ends thereof; and hitch means comprising a generally U-shaped, monopole drawbar having a coupling member at its forward end and a rear, upright stanchion positioned centrally of said front beam segments of said chassis structure, the base of said upright stanchion being secured to the forward ends of said front beam segments of said chassis structure by a pair of strut beams extending outwardly and rearwardly from opposite sides of said upright stanchion to the forward ends of said front beam segments.

8. The combination of a tilt bed trailer with a chassis and tilt bed support structure as defined in claim 7 wherein:

said rear beam segments of said chassis frame beams are laterally spaced apart by a distance substantially coinciding with the length of said axle in a direction transversely of said truck body, with said rear beam segments being supported on said axle in immediate proximity to said wheels mounted on opposite ends of said axle.

* * * * *